United States Patent
Agostinelli et al.

(10) Patent No.: US 7,111,943 B2
(45) Date of Patent: Sep. 26, 2006

(54) WIDE FIELD DISPLAY USING A SCANNED LINEAR LIGHT MODULATOR ARRAY

(75) Inventors: John A. Agostinelli, Rochester, NY (US); David Kessler, Rochester, NY (US); Marek W. Kowarz, Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 63 days.

(21) Appl. No.: 10/732,733

(22) Filed: Dec. 10, 2003

(65) Prior Publication Data

US 2005/0024722 A1 Feb. 3, 2005

Related U.S. Application Data

(60) Provisional application No. 60/490,568, filed on Jul. 28, 2003.

(51) Int. Cl.
*G03B 21/14* (2006.01)
*G03B 21/56* (2006.01)

(52) U.S. Cl. ......................................... 353/79; 359/451
(58) Field of Classification Search ................ 359/451; 353/50, 69, 70, 31, 98, 122, 79
See application file for complete search history.

(56) References Cited

U.S. PATENT DOCUMENTS

| | | | |
|---|---|---|---|
| 5,023,725 A | 6/1991 | McCutchen | |
| 5,179,440 A | 1/1993 | Loban et al. | |
| 5,311,360 A | 5/1994 | Bloom et al. | |
| 5,566,370 A | 10/1996 | Young | |
| 6,042,238 A | 3/2000 | Blackham et al. | |
| 6,307,663 B1 | 10/2001 | Kowarz | |
| 6,323,984 B1 | 11/2001 | Trisnadi | 359/245 |
| 6,411,425 B1 | 6/2002 | Kowarz et al. | |
| 6,511,182 B1 | 1/2003 | Agostinelli et al. | 353/7 |
| 6,779,892 B1 * | 8/2004 | Agostinelli et al. | 353/31 |
| 6,897,992 B1 * | 5/2005 | Kikuchi | 355/53 |
| 2003/0048390 A1 | 3/2003 | Welch et al. | |
| 2003/0184531 A1 | 10/2003 | Morikawa et al. | 345/204 |
| 2005/0041219 A1 | 2/2005 | Streid et al. | |

FOREIGN PATENT DOCUMENTS

EP 0211 596 A2 7/1986

* cited by examiner

*Primary Examiner*—Christopher Mahoney
(74) *Attorney, Agent, or Firm*—Stephen H. Shaw

(57) ABSTRACT

A display apparatus for providing an image on a curved display surface includes a line image generation apparatus for generating a modulated line image, where the line image generation apparatus includes a laser light source for providing an illumination beam, a linear spatial light modulator for modulating the illumination beam to provide a modulated line image as at least one diffracted order of the illumination beam, a projection lens for directing the modulated line image toward a line image scanner for scanning the modulated light beam to form a two-dimensional image on the curved display surface, wherein the line image scanner is optically disposed near the center of curvature of the curved display surface.

88 Claims, 7 Drawing Sheets

WIDE FIELD DISPLAY USING A SCANNED LINEAR LIGHT MODULATOR ARRAY

CROSS REFERENCE TO RELATED APPLICATIONS

This is a 111A application of Provisional Application Serial No. 60/490,568 filed Jul. 28, 2003. Therefore, this non-provisional application Ser. No. 10/732,733 filed on Dec. 10, 2003 claims priority from the provisional application 60/490,568 filed Jul. 28, 2003.

FIELD OF THE INVENTION

This invention generally relates to projection apparatus and more particularly relates to an apparatus for projection from a scanned linear image source onto a curved screen.

BACKGROUND OF THE INVENTION

There is considerable interest in displays that provide a wide field-of-view, particularly in flight simulation and entertainment markets. Wide field-of-view displays overcome the inherent limitations of conventional cathode-ray tube (CRT) display technology, where display imaging is dimensionally and geometrically constrained to a generally flat, rectangular surface. Strategies for providing wide field-of-view displays have included tiling of projection surfaces, where multiple projectors each provide a portion of a tiled, panoramic image. Examples of tiled display systems using this type of approach to effect a wide field-of-view include the rear projection faceted dome disclosed in U.S. Pat. No. 5,179,440 issued Jan. 12, 1993 to Loban et al., and entitled "Rear Projection Facetted Dome" and dodecahedral imaging system disclosed in U.S. Pat. No. 5,023,725 issued Jun. 11, 1991 to McCutchen, and entitled "Method And Apparatus For Dodecahedral Imaging System." Other types of systems provide a wide field-of-view by directing multiple projectors to a single curved screen, as is disclosed in U.S. Pat. No. 6,042,238 issued Mar. 28, 2000 to Blackham et al., and titled "Image Projection Display System For Use In Large Field-Of-View Presentation" and in U.S. Pat. No. 5,566,370 issued Oct. 15, 1996 to Young, and entitled "simulation Display System."

As is well recognized, systems using multiple projectors are disadvantaged due to their high cost and due to the considerable effort needed for synchronization of multiple projected images. Among major disadvantages of tiled displays are differences between tiles, making it difficult to obtain uniform brightness, contrast, and color presentation from tile to tile. Related to this problem is the difficulty of eliminating or minimizing the visible display boundary between tiles. It is very difficult to effect a smooth transition between one tile and the next. In some applications, image uniformity across tile segments is very important, such as for collimated flight simulator displays, for example. In such applications, however, there can be significant ongoing cost and effort in order to maintain this tile-to-tile uniformity. For these reasons, conventional solutions for tiled wide field-of-view simulation systems have proved cumbersome and expensive, with disappointing image quality, low image brightness, and less than ideal image resolution.

As digital imaging technologies evolve, there is heightened interest in displays that provide a wide field-of-view, having sufficient brightness and high resolution. There are recognized advantages to displays that partially "surround" the viewer or operator with a panoramic view, taking advantage of a broader field of vision that could be provided. In addition to the demand in large-scale simulation and entertainment applications, wide field-of-view displays have also been considered for extending the usability of desktop computer workstation environments that currently use conventional windowing technology. For example, wide field-of-view displays are expected to find applications for improving CAD software operation, for improved control systems monitoring uses, and for numerous other types of applications. However, a number of obstacles currently prevent the widespread use of wide field-of-view displays, placing constraints on size, cost, image quality and resolution, and brightness.

Linear arrays, which can be considered as one-dimensional spatial light modulators, offer inherent imaging performance advantages, including the capability for high resolution, high brightness, low cost, and simple illumination optics requirements using laser sources. In many imaging applications, linear arrays are more suitable modulators for laser light than are their two-dimensional spatial light modulator counterparts, such as reflective and transmissive LCD and Digital Micromirror (DMD) devices. Grating Light Valve (GLV) linear arrays, as described in U.S. Pat. No. 5,311,360 issued May 10, 1994 to Bloom et al., and titled "Method And Apparatus For Modulating A Light Beam" are one earlier type of linear array that offers a workable solution for high-brightness imaging using laser sources, for example. Another experimental type of linear array just recently disclosed and in early development stages is the flexible micromirror linear array, as disclosed in U.S. patent application Ser. No. 2003/0048390 by Welch et al., published Mar. 13, 2003, and entitled "Video Projector And Optical Light Valve Therefor." The prototype flexible micromirror linear array described in the U.S. patent application Ser. No. 2003/0048390 disclosure employs a line of reflective "microbridges" which are individually switched to modulate light to form a linear image.

Recently, an electromechanical conformal grating device consisting of ribbon elements suspended above a substrate by a periodic sequence of intermediate supports was disclosed by Kowarz in U.S. Pat. No. 6,307,663, entitled "Spatial Light Modulator With Conformal Grating Device" issued Oct. 23, 2001. The electromechanical conformal grating device is operated by electrostatic actuation, which causes the ribbon elements to conform around the support substructure, thereby producing a grating. The device of '663 has more recently become known as the conformal GEMS device, with GEMS standing for Grating Electro-Mechanical System. The conformal GEMS device possesses a number of attractive features. It provides high-speed digital light modulation with high contrast and good efficiency. In addition, in a linear array of conformal GEMS devices, the active region is relatively large and the grating period is oriented perpendicular to the array direction. This orientation of the grating period causes diffracted light beams to separate in close proximity to the linear array and to remain spatially separated throughout most of an optical system. When used with laser sources, GEMS devices provide excellent brightness, speed, and contrast.

U.S. Pat. No. 6,411,425 issued Jun. 25, 2002 to Kowarz et al., and entitled "Electromechanical Grating Display System With Spatially Separated Light Beams" discloses an imaging system employing GEMS devices in a number of printing and display embodiments. As with its GLV counterpart or with a flexible micromirror linear array, a GEMS device modulates a single color and a single line of an image at a time.

Monocentric projection would clearly have advantages for providing an image on a surface having a generally cylindrical shape. However, for monocentric projection on a substantially cylindrical display screen, the ideal position for projection components is also the preferred viewer position. This problem, then, typically requires some type of off-axis solution. However, off-axis projection systems can be fairly complex and costly, particularly where a wide field-of-view is needed.

In spite of the shortcomings of prior art solutions, it is recognized that there would be significant advantages in providing an image display having a wide field-of-view. Freed from the "boxy" constraints of the conventional CRT model, a wide field-of-view display apparatus employing a curved display surface would be able to provide a more versatile and flexible environment, take advantage of additional display space, and provide a more enveloping visual environment suited to simulation, workstation, control monitoring, and entertainment applications.

Curved display surfaces can include both front and rear projection screens. Both front and rear projection screens can be directly viewed in some applications. In simulation environments, a curved display surface may not be directly viewed but may instead be used for providing an intermediate image to a curved mirror, as disclosed in U.S. Pat. No. 6,042,238 (Blackham et al.), for example. The curved mirror then provides a collimated virtual image of the intermediate image.

Thus, it can be seen that there is a need for an economical display apparatus providing a curved viewing surface having a very wide field-of-view, high resolution, good uniformity across the field, and high brightness.

SUMMARY OF THE INVENTION

It is an object of the present invention to provide a display apparatus having high resolution with a wide field-of-view. With this object in mind, the present invention provides a display apparatus for providing a two-dimensional image on a curved display surface comprising: (a) a line object generation apparatus for generating a modulated light beam, comprising: (a1) a laser light source for providing an illumination beam; (a2) a linear spatial light modulator for modulating the illumination beam to form the modulated light beam; (b) a projection lens for directing the modulated light beam toward a line image scanner for forming a line image on the curved display surface and for scanning the modulated light beam to form the two-dimensional image on the curved display surface, wherein the line image scanner is optically disposed near the center of curvature of the curved display surface.

It is a feature of the present invention that it employs a single image generation apparatus, using scanning techniques for generating, from a single modulated image line at a time, a curved image having a wide field-of-view. The present invention enjoys the advantages of monocentric optical design, such as minimized distortion, without obstructing the visibility of a curved display. The scanning mirror of the image generation apparatus is configured to be optically near to the observer's eye level, yet without obstructing the observer.

It is an advantage of the present invention that it provides a display having high resolution and high brightness level.

It is a further advantage of the present invention that it provides an improved color gamut over conventional wide field-of-view imaging systems.

It is a further advantage of the present invention that it provides a curved image for either front or rear projection display.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

To facilitate understanding, identical reference numerals have been used, where possible, to designate identical elements that are common to the figures.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Desktop Embodiment

Figure 1:
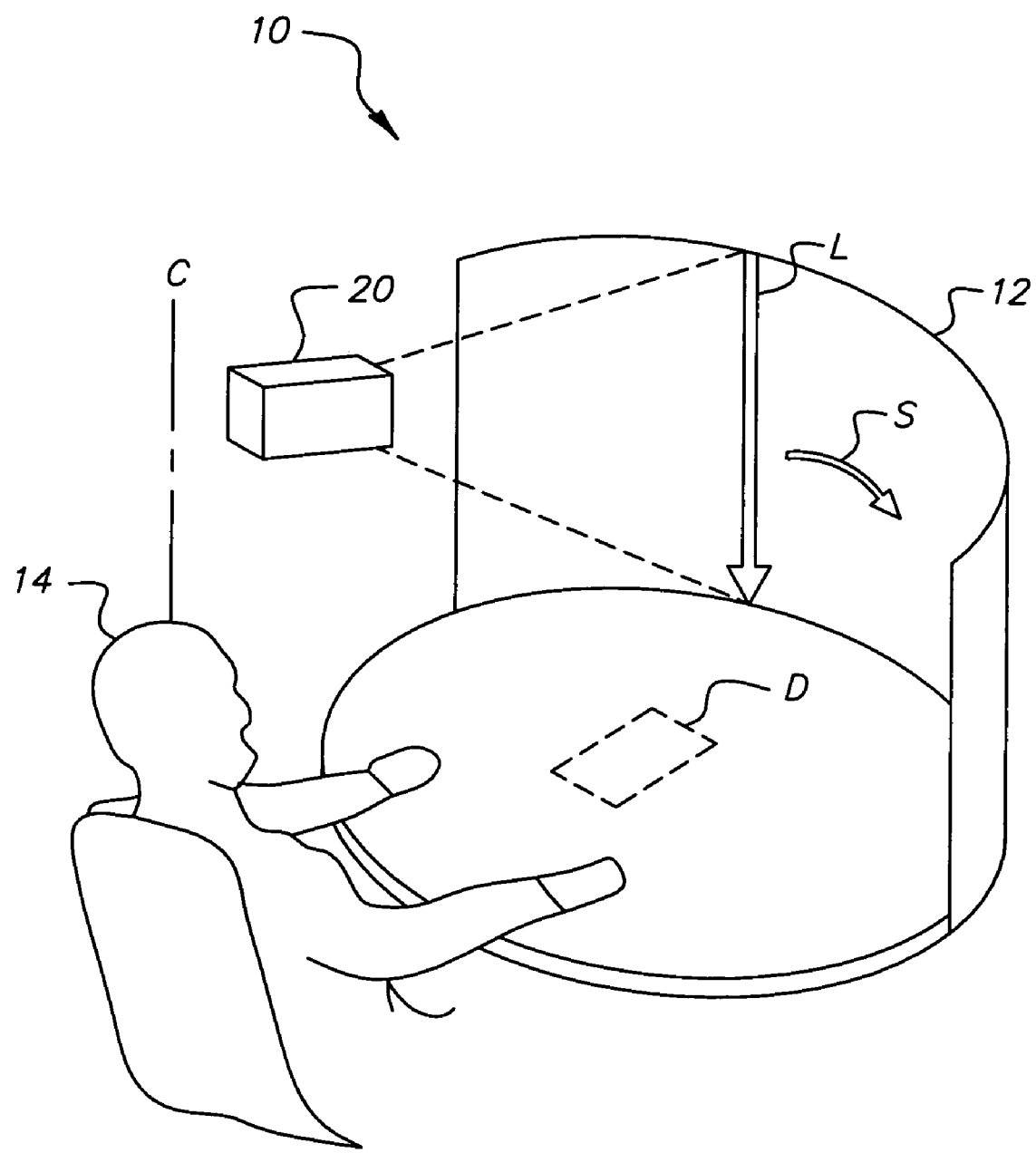
FIG. 1 is a perspective view showing an embodiment of the apparatus of the present invention in a desktop configuration.

Referring to FIG. 1, there is shown a perspective view of a desktop embodiment of a display apparatus 10 of the present invention. A viewer 14 is seated in front of a curved display surface 12. An image generation system 20 forms a two-dimensional image on curved display surface 12 by forming a single line L at a time, then scanning successive lines L across curved display surface 12 in a scan direction S. Curved display surface 12 has a center of curvature C that is generally coincident with the preferred viewing position of viewer 14.

Figure 2:
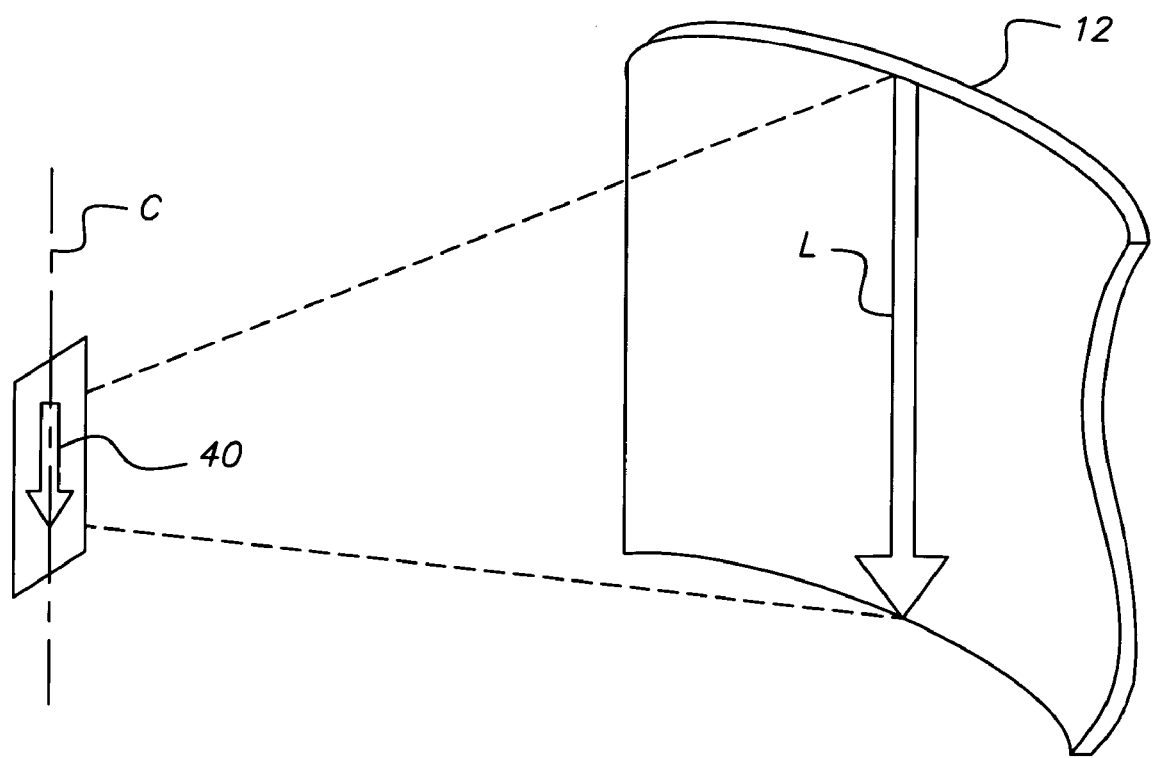
FIG. 2 is a side view, in perspective, showing an idealized scanner location.
Figure 3:
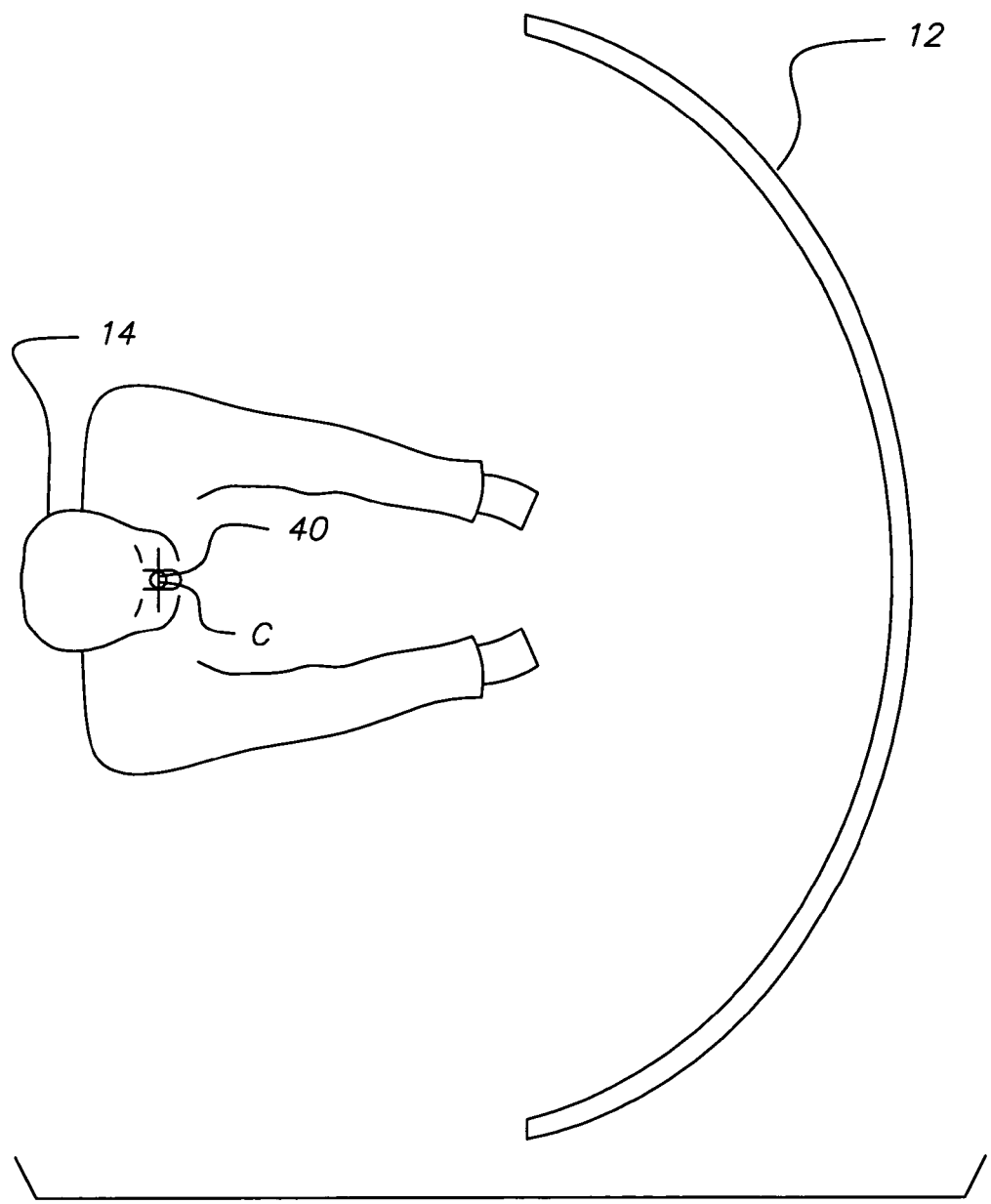
FIG. 3 is a top view showing the relationship of an idealized scan image location to a seated observer.

Referring to the perspective view of FIG. 2 and to the top view of FIG. 3, the ideal spatial position of a line image scanner 40 for projection is shown, at the center of curvature C of curved display surface 12. With line image scanner 40 centered at center of curvature C, scanned line L is projected with minimal distortion. However, as is shown in FIG. 3, the ideal location of line image scanner 40 is coincident with the best location for viewer 14. Since both viewer 14 and image generation system 20 cannot occupy the same spatial position, some adaptation of the optical path is required.

Figure 4:
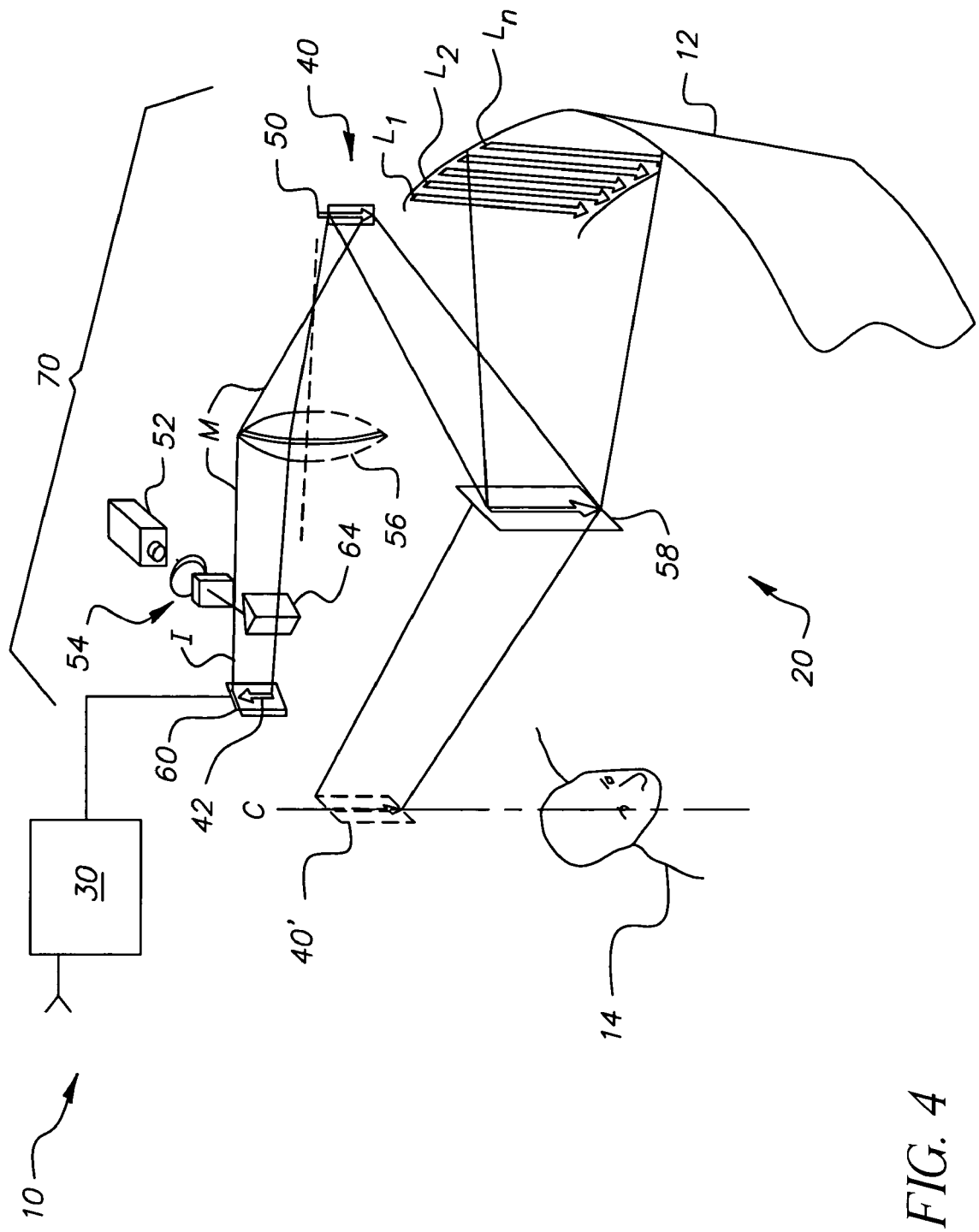
FIG. 4 is a block diagram view in perspective showing optical components of the present invention relative to a viewer in one embodiment of the present invention.
Figure 5:
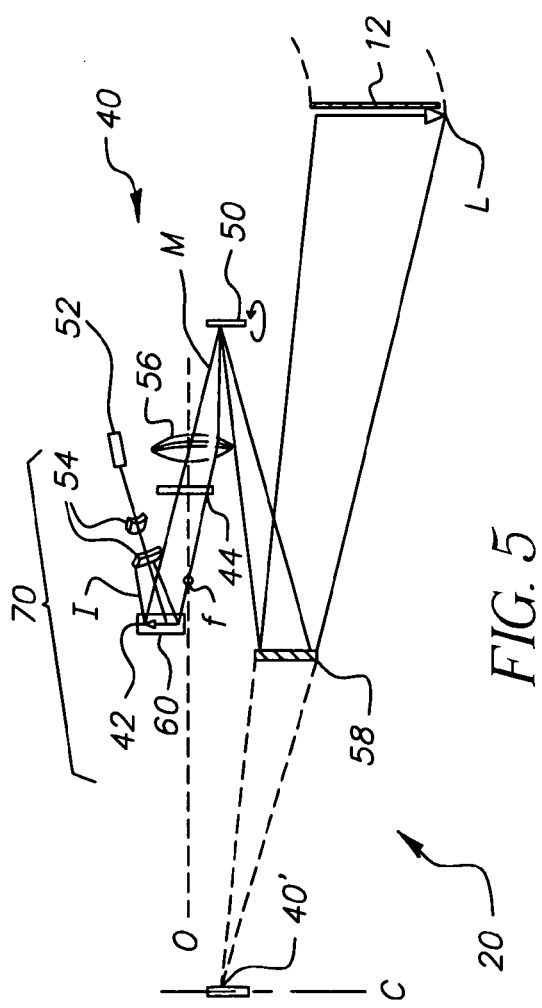
FIG. 5 is a side view showing the off-axis arrangement of optical components in the embodiment of FIG. 4.

Referring to the perspective view of FIG. 4 and the schematic side view of FIG. 5, there is shown an arrangement of key optical components of image generation system 20 in one embodiment. A line object generation apparatus 70, comprising illumination and modulation components, forms line object 42 for projection onto curved display surface 12, according to image data and commands from a control logic processor 30. A laser source 52 directs light through one or more lenses 54 that provide beam shaping and direct the laser illumination beam I for modulation at an electromechanical grating light modulator 60, such as a GEMS or GLV device or a micromirror linear array. A blocking element 64 is provided to prevent unwanted zeroeth order light from being projected. In an embodiment using GEMS modulation, at least one diffracted order of the laser illumination provides the modulated light beam M for forming line object 42 to a projection lens 56 that directs the modulated light beam to a line image scanner 40 comprising a scanning element 50 and a folding mirror 58. Folding mirror 58 effectively images line image scanner 40 to the virtual position of imaged line scanner 40', centered near center of curvature C for curved display surface 12. This arrangement is beneficial for allowing headspace for viewer 14, moving the components of image generation system 20 away from a position directly above viewer 14, while at the same time providing imaging that is optically monocentric.

It can be appreciated that the overall arrangement of FIG. 4 admits a number of modifications within the spirit of the present invention. In the embodiment of line object generation apparatus 70 shown in FIG. 4, blocking element 64 typically both directs the illumination beam I from laser source 52 toward electromechanical grating light modulator 60 and, acting as a type of spatial filter, blocks the unwanted, zeroeth order light reflected from the surface of electromechanical grating light modulator 60 from the modulated light beam M. However, light from laser source 52 could alternately be provided at an oblique angle relative to the surface of electromechanical grating light modulator 60, so that zeroeth order unwanted light is otherwise effectively prevented from being projected, such as using a stop of some kind as a type of spatial filter.

FIG. 5 shows an arrangement providing the illumination beam I from laser source 52 to electromechanical grating light modulator 60 at an oblique angle. With such an arrangement, a spatial filter 44 is provided for selecting the desired light and blocking the unwanted light from the modulated light beam M. Depending on the type of modulation employed, spatial filter 44 could be either of the following:

(i) a slit or aperture; or,
(ii) a blocking component, used similarly to blocking element 64 in FIG. 4.

For GEMS devices in general, best contrast is obtained by obstructing zeroeth order light and by selecting the non-zero diffracted orders of light in the modulated light beam M. Therefore, the best arrangement for contrast is to use a blocking component for spatial filter 44, for blocking zeroeth order light reflected from electromechanical grating light modulator 60. Conversely, however, best brightness and generally simpler and more compact designs with GEMS devices are obtained by selecting the zero order light and obstructing diffracted orders. Thus, a decision on the trade-off between optimizing contrast or optimizing display brightness and other design factors will determine the configuration of spatial filter 44 for blocking either zeroeth or non-zero diffracted orders from the modulated light beam M.

Not represented in FIG. 4 or 5 are the additional components that would be provided for obtaining full color imaging. Techniques for combining component Red, Green, Blue (RGB) and other possible colors are described in detail in commonly assigned U.S. Pat. No. 6,411,425, "Electromechanical Grating Display System With Spatially Separated Light Beams" (Kowarz et al.), incorporated herein by reference.

As shown in FIG. 4, scanning element 50 is typically used for line image scanner 40. Scanning element 50 typically comprises a motor-driven galvanometer mirror, a rotating polygon, or some other suitable scanning device for forming a two dimensional image from sequentially scanned lines $L_1, L_2, \ldots L_n$. Scanning element 50 could be either a rotating or reciprocating scanner.

As shown in FIGS. 4 and 5, projection lens 56 projects line object 42 from line object generation apparatus 70; however, only about half the field of projection lens 56 is used in forming the image of line object 42 at line image scanner 40. This arrangement helps to minimize image distortion in scanned lines L and allows image generation system 20 to be spatially separated from the path of projected light, so that components of image generation system 20 neither obstruct projected light nor constrain field dimensions. FIG. 5 shows, from a side view, how the off-axis arrangement of image generation system 20 components operates to leave the projection path unobstructed. Line object 42 is formed at a spatial position that is just offset from the optical axis O of projection lens 56 and somewhat past its focal point f. Scanning element 50 of line image scanner 40 is also positioned offset from optical axis O, directing light to folding mirror 58 at an oblique angle. As a beneficial result of this arrangement, viewer 14 can be positioned at or near center of curvature C and optical components of image generation system 20 do not obstruct the projection path.

By using a laser illumination beam I, display apparatus 10 provides a display having a large color gamut. The curvature of curved display surface 12, generally cylindrical, provides an optimal arrangement for monocentric imaging, with low distortion.

In the embodiment of FIGS. 1 and 4, image generation system 20 is spatially disposed above the eye level of viewer 14. However, with the appropriate changes to the positioning of optical components, image generation system 20 may alternately be placed on or below desktop level, such as near alternate desktop location D indicated in dotted lines in FIG. 1. A desktop arrangement may be advantageous, for example, for portability of display apparatus 10. Image generation system 20 could be mounted behind or as part of a keyboard or control console with respect to viewer 14, for example.

Further compactness of image generation 20 could be achieved by providing slight curvature to folding mirror 58. With reference to FIG. 5, for example, convex curvature of the reflective face of folding mirror 58 would effectively shift the position of imaged line image scanner 40' towards curved display surface 12 and reduce the relative size of imaged line image scanner 40'. Conversely, concave curvature of the reflective face of folding mirror 58 would effectively shift the position of imaged line image scanner

40' further back from curved display surface 12 and increase the relative size of imaged line image scanner 40'.

In one preferred embodiment, scanning element 50 is positioned at the Fourier plane of projection lens 56, where the modulated light beam M is smallest, minimizing the required size of scanning element 50.

Rear Projection Embodiments

Figure 7:
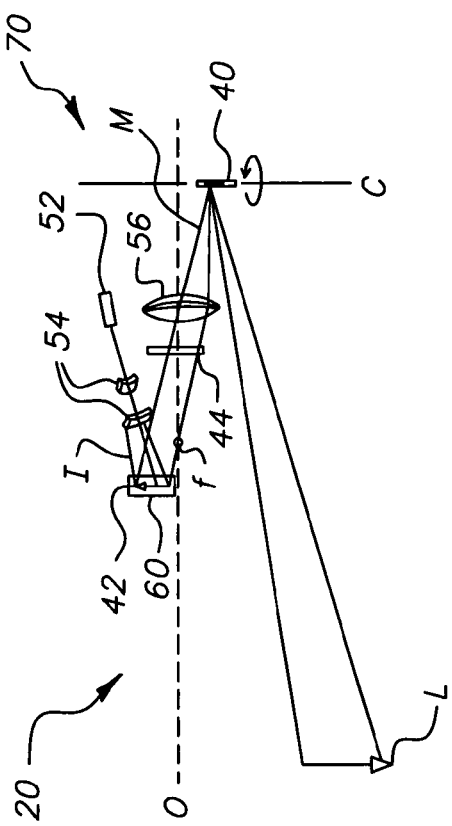
FIG. 7 is a side view showing the off-axis arrangement of optical components in the embodiment of FIG. 6.
Figure 6:
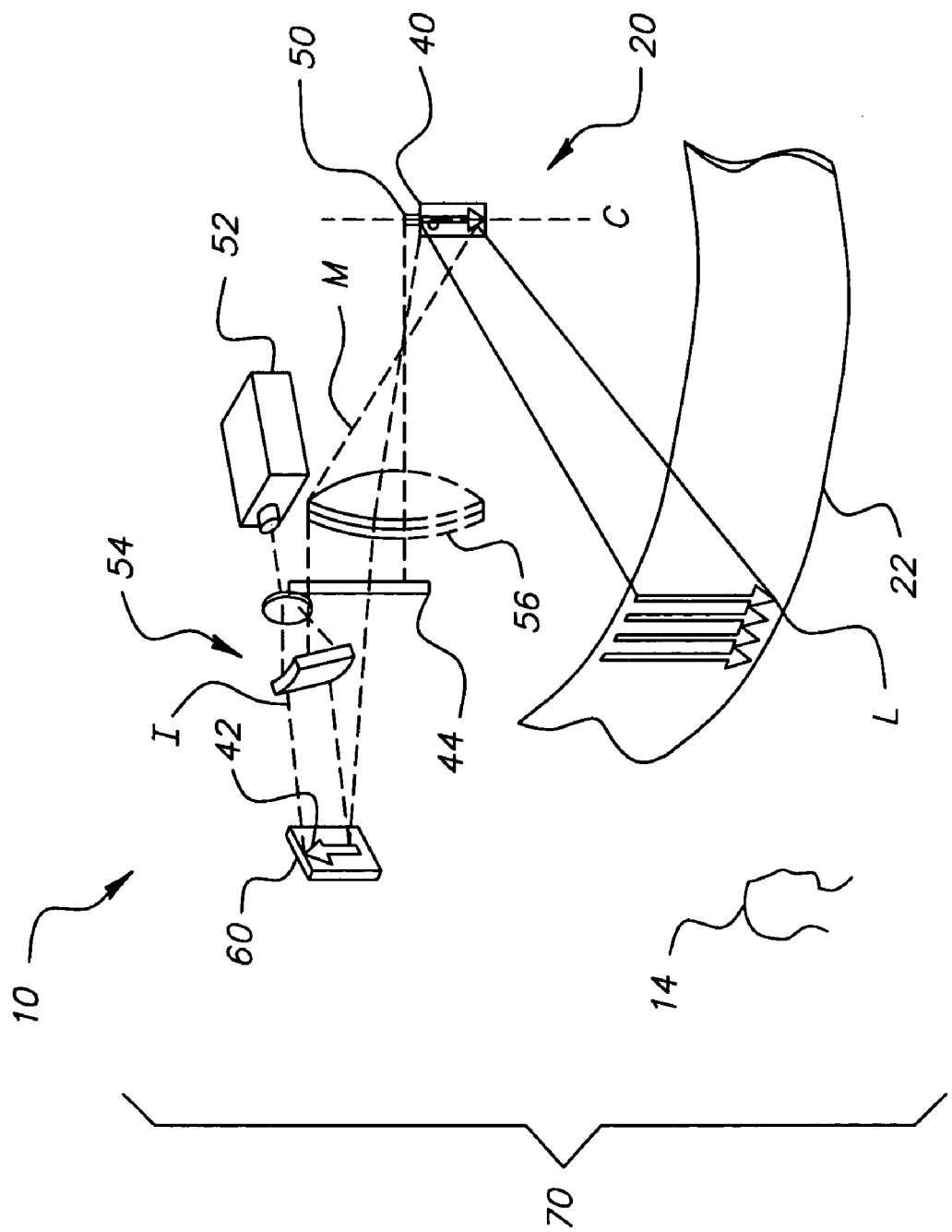
FIG. 6 is a block diagram view in perspective showing optical components of the present invention used in a rear projection embodiment.

Referring to the perspective view of FIG. 6 and its corresponding schematic diagram in FIG. 7, there is shown an alternate embodiment of display apparatus 10 of the present invention for projection onto a rear projection screen 22, such as might be used for advertising or museum display, for example. For this rear projection embodiment, there is no spatial conflict between ideal viewing position for viewer 14 and ideal layout of image generation system 20. That is, unlike the inherent spatial constraints of desktop embodiment of FIGS. 1 and 4, the rear projection embodiment of FIGS. 6 and 7 allows positioning of line image scanner 40 directly at the center of curvature C of rear projection screen 22. The off-axis positioning of image generation system 20, as shown in FIG. 7, is also advantaged in a rear projection embodiment. As was noted similarly with respect to FIGS. 4 and 5, off-axis positioning removes components of image generation system 20 from obstructing the path of scanned projected light. This arrangement also allows successive projected lines L to be free of distortion and in good focus over the entire wide-field scan.

In contrast to the arrangement of FIG. 4, FIGS. 6 and 7 show arrangements of line object generation apparatus 70 using oblique illumination from laser source 52, with spatial filter 44 deployed for blocking unwanted diffracted orders. As was noted above, design considerations such as brightness, contrast, and compactness are factors in choosing the type of spatial filter 44 employed in a specific embodiment. In FIG. 6, illumination beam I from laser source 52 is horizontally oblique, with laser source 52 and electromechanical grating light modulator 60 disposed substantially on the same horizontal plane. Alternately, laser source 52 could direct illumination to electromechanical grating light modulator 60 at a vertically oblique angle, with laser source 52 and electromechanical grating light modulator 60 disposed substantially on the same vertical plane. As yet another alternative, a compound oblique arrangement, as is shown in FIG. 7, could be used, wherein laser source 52 directs illumination from an angle having both vertical and horizontal displacement. With the compound oblique arrangement of FIG. 7, the optical components of line object generation apparatus 70 do not obstruct the path of diffracted light from electromechanical grating light modulator 60. It is instructive to note that any of the three basic oblique illumination arrangements, that is, horizontal, vertical, or compound oblique illumination, with necessary adaptations to the optical path, could be employed for either front or rear projection configurations of display apparatus 10.

Use of oblique illumination angles and off-axis optics allows display apparatus 10 to provide a very wide viewing angle, even approaching 360 degrees. Either a vertical oblique or a compound oblique illumination angle would allow almost 360 degree projection for either front or rear projection embodiments, using, for example, a rotating bigon as scanning element 50.

Embodiment For Collimated Display

Figure 8:
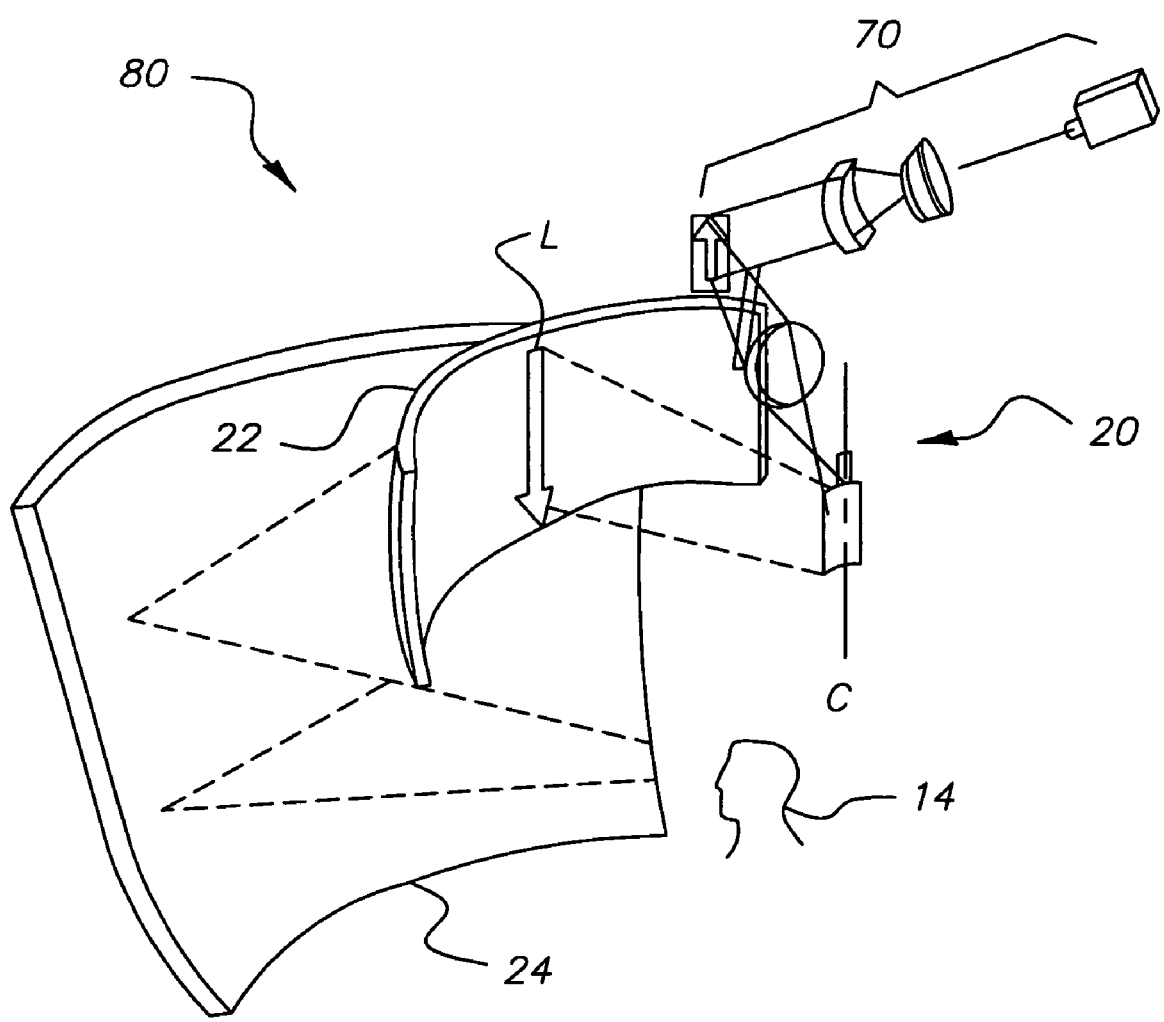
FIG. 8 is a schematic view showing the use of a rear projection curved display in a display apparatus used for providing a collimated image.

Referring to FIG. 8 there is shown an embodiment using image generation system 20 of the present invention in a collimated display 80, such as is typically preferred for displays used in simulation environments. Here, projection onto rear projection screen 22 forms an intermediate image for collimation by a curved mirror 24. Rear projection screen 22 is placed near a focal surface of curved mirror 24. In a wide-field collimated display 80 embodiment, the off-axis arrangement shown in FIG. 7 is advantageous for image generation system 20, allowing an unobstructed projection path, as has been noted above. To take advantage of monocentric optical design, the center of curvature C of projection screen 22 is ideally coincident, or at least close to, the center of curvature of curved mirror 24.

As is shown particularly in FIGS. 4 and 6, only about half of projection lens 56 may be used in some embodiments. In such a case, projection lens 56 could be truncated with some arrangements of line object generation apparatus 70, to reduce cost and size.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, line object generation apparatus 70 may employ any suitable type of linear spatial light modulator, such as a GEMS device, a GLV device, a linear micromirror array, or some other component for producing line object 42, with the necessary modifications to support optical components, as is well known in the imaging arts.

By placing line image scanner 40 optically at or near the center of curvature of curved display surface 12, display apparatus 10 provides an image over a wide field having focus and distortion within acceptable limits. Empirical results indicate that some tolerance is allowable for placement of line image scanner 40 relative to the actual center of curvature. For the apparatus and method of the present invention, optically "near" the center of curvature of curved display surface 12 can be considered to be within a distance of no further than about 30% of the optical radius from the actual center of curvature to curved display surface 12.

In the embodiments described with reference to FIGS. 1–8 above, curved display surface 12 provides a cylindrically or spherically curved surface. However, some allowable variation of curvature would be within the scope of the present invention, allowing even aspherical surfaces. Where curved display surface 12 is not precisely cylindrical or spherical, using a best-fit radius of curvature can be employed as an approximation in order to locate the optimal center of curvature position for placement of line image scanner 40.

Thus, what is provided is an apparatus and method for projection from a scanned linear image source onto a curved screen providing a wide field-of-view.

PARTS LIST

10 display apparatus
12 curved display surface
14 viewer
20 image generation system
22 rear projection screen
24 curved mirror
30 control logic processor
40 line image scanner
40' imaged line image scanner
42 line object
44 spatial filter
50 scanning element
52 laser source 54 lens
56 projection lens
58 folding mirror
60 electromechanical grating light modulator
64 blocking element
70 line object generation apparatus
80 collimated display

What is claimed is:

1. A display apparatus for providing a two-dimensional image on a curved display screen comprising:
   (a) a line object generation apparatus for generating a modulated light beam, comprising:
      (a1) a laser light source for providing an illumination beam;
      (a2) a linear spatial light modulator for modulating the illumination beam to form the modulated light beam;
   (b) a projection lens for directing the modulated light beam toward a line image scanner for forming a line image on the curved display and for scanning the modulated light beam to form the two-dimensional image on the curved display, wherein the line image scanner is optically disposed near center of curvature of the curved display.

2. A display apparatus according to claim 1 wherein the line object generation apparatus is disposed above the eye level of an observer.

3. A display apparatus according to claim 1 wherein the line object generation apparatus is placed below the eye level of an observer.

4. A display apparatus according to claim 1 wherein the curved display screen is a rear projection screen.

5. A display apparatus according to claim 1 wherein the linear spatial light modulator comprises an array of GEMS elements.

6. A display apparatus according to claim 1 wherein the linear spatial light modulator comprises a GLV device.

7. A display apparatus according to claim 1 wherein the linear spatial light modulator comprises a micromirror linear array.

8. A display apparatus according to claim 1 wherein the linear spatial light modulator provides the modulated light beam as at least one diffracted order of the illumination beam.

9. A display apparatus according to claim 8 further comprising a spatial filter for providing the at least one diffracted order of the illumination beam.

10. A display apparatus according to claim 9 wherein the spatial filter blocks zeroeth order reflected light from the linear spatial light modulator.

11. A display apparatus according to claim 9 wherein the spatial filter blocks a non-zeroeth order diffracted light from the linear spatial light modulator.

12. A display apparatus according to claim 1 wherein the linear spatial light modulator is optically off-axis with respect to the projection lens.

13. A display apparatus according to claim 1 wherein the laser light source provides the illumination beam at a vertically oblique angle with respect to the linear spatial light modulator.

14. A display apparatus according to claim 1 wherein the laser light source provides the illumination beam at a compound oblique angle with respect to the linear spatial light modulator.

15. A display apparatus according to claim 1 wherein the line image scanner comprises a folding mirror.

16. A display apparatus according to claim 15 wherein the folding mirror is curved.

17. A display apparatus according to claim 1 wherein the line image scanner comprises a galvanometer.

18. A display apparatus according to claim 1 wherein the line image scanner comprises a rotating polygon.

19. A display apparatus according to claim 1 wherein the line image scanner comprises a rotating bigon.

20. A display apparatus according to claim 1 wherein the line image scanner employs reciprocating motion.

21. A display apparatus according to claim 1 wherein the line image scanner is optically disposed within about 30% of the radius distance from the center of curvature to the curved display screen.

22. A display apparatus according to claim 1 wherein the center of curvature of the display screen is determined using a best fit circular approximation.

23. A display apparatus according to claim 1 wherein the curved display screen is cylindrical.

24. A display apparatus according to claim 1 wherein the curved display screen is spherical.

25. A display system for providing a substantially collimated image to a viewer, comprising:
   (a) a curved mirror;
   (b) a curved display screen disposed near a focal surface of the curved mirror and having a center of curvature near the center of curvature of the curved mirror for providing an intermediate image for collimation by the curved mirror;
   (c) an image generation system for forming the intermediate image on the curved display screen, the image generation system comprising:
      (c1) a line object generation apparatus for generating a modulated light beam, comprising:
         (i) a laser light source for providing an illumination beam;
         (ii) a linear spatial light modulator for modulating the illumination beam to form the modulated light beam;
      (c2) a projection lens for directing the modulated light beam toward a line image scanner for forming a line image on the curved display screen and for scanning the modulated light beam to form the intermediate image as a two-dimensional image, wherein the line image scanner is optically disposed near center of curvature of the curved display screen.

26. A display apparatus according to claim 25 wherein the linear spatial light modulator comprises an array of GEMS elements.

27. A display apparatus according to claim 25 wherein the linear spatial light modulator comprises a GLV device.

28. A display apparatus according to claim 25 wherein the linear spatial light modulator comprises a micromirror linear array.

29. A display apparatus according to claim 25 wherein the linear spatial light modulator provides the modulated line image as at least one diffracted order of the illumination beam.

30. A display apparatus according to claim 29 further comprising a spatial filter for providing the at least one diffracted order of the illumination beam.

31. A display apparatus according to claim 30 wherein the spatial filter blocks zeroeth order reflected light from the linear spatial light modulator.

32. A display apparatus according to claim 30 wherein the spatial filter blocks non-zero order diffracted light from the linear spatial light modulator.

33. A display apparatus according to claim 25 wherein the linear spatial light modulator is optically off-axis with respect to the projection lens.

34. A display apparatus according to claim 25 wherein the laser light source provides the illumination beam at a vertically oblique angle with respect to the linear spatial light modulator.

35. A display apparatus according to claim 25 wherein the laser light source provides the illumination beam at a compound oblique angle with respect to the linear spatial light modulator.

36. A display apparatus according to claim 25 wherein the line image scanner comprises a folding mirror.

37. A display apparatus according to claim 36 wherein the folding mirror is curved.

38. A display apparatus according to claim 25 wherein the line image scanner comprises a galvanometer.

39. A display apparatus according to claim 25 wherein the line image scanner comprises a rotating polygon.

40. A display apparatus according to claim 25 wherein the line image scanner comprises a rotating bigon.

41. A display apparatus according to claim 25 wherein the line image scanner employs reciprocating motion.

42. A display apparatus according to claim 25 wherein the line image scanner is optically disposed within about 30% of the radius distance from the center of curvature to the curved display screen.

43. A display apparatus for providing a two-dimensional image on a display surface comprising:
   (a) a line object generation apparatus for generating a modulated light beam, comprising a laser light source for providing an illumination beam at a compound oblique angle to a linear spatial light modulator for modulating the illumination beam to form the modulated light beam; and
   (b) a projection lens for directing the modulated light beam toward a line image scanner for forming a line image on the display surface and for scanning the modulated light beam to form the two-dimensional image on the display screen.

44. A display apparatus according to claim 43 wherein the linear spatial light modulator is optically off-axis relative to the projection lens.

45. A display apparatus according to claim 43 wherein the linear spatial light modulator comprises an array of GEMS elements.

46. A display apparatus according to claim 43 wherein the linear spatial light modulator comprises a GLV device.

47. A display apparatus according to claim 43 wherein the linear spatial light modulator comprises a micromirror linear array.

48. A display apparatus according to claim 43 wherein the linear spatial light modulator provides the modulated light beam as at least one diffracted order of the illumination beam.

49. A display apparatus according to claim 48 further comprising a spatial filter for providing the at least one diffracted order of the illumination beam.

50. A display apparatus according to claim 49 wherein the spatial filter blocks zeroeth order reflected light from the linear spatial light modulator.

51. A display apparatus according to claim 49 wherein the spatial filter blocks a non-zeroeth order diffracted light from the linear spatial light modulator.

52. A display apparatus according to claim 43 wherein the line image scanner comprises a folding mirror.

53. A display apparatus for providing a two-dimensional image on a display surface comprising:
   (a) a line object generation apparatus for generating a modulated light beam, comprising a laser light source for providing an illumination beam at a vertical oblique angle to a linear spatial light modulator for modulating the illumination beam to form the modulated light beam;
   (b) a projection lens for directing the modulated light beam toward a line image scanner for forming a line image on the display surface and for scanning the modulated light beam to form the two-dimensional image on the display screen.

54. A display apparatus according to claim 53 wherein the linear spatial light modulator is optically off-axis relative to the projection lens.

55. A display apparatus according to claim 53 wherein the linear spatial light modulator comprises an array of GEMS elements.

56. A display apparatus according to claim 53 wherein the linear spatial light modulator comprises a GLV device.

57. A display apparatus according to claim 53 wherein the linear spatial light modulator comprises a micromirror linear array.

58. A display apparatus according to claim 53 wherein the linear spatial light modulator provides the modulated light beam as at least one diffracted order of the illumination beam.

59. A display apparatus according to claim 58 further comprising a spatial filter for selecting the at least one diffracted order of the illumination beam.

60. A display apparatus according to claim 59 wherein the spatial filter blocks zeroeth order reflected light from the linear spatial light modulator.

61. A display apparatus according to claim 59 wherein the spatial filter blocks a non-zeroeth order diffracted light from the linear spatial light modulator.

62. A display apparatus according to claim 53 wherein the wherein the line image scanner comprises a folding mirror.

63. A method for providing an image on a curved display screen comprising:
   (a) generating a modulated light beam by directing a laser illumination beam to a linear spatial light modulator and modulating the spatial light modulator to form a line object thereon;
   (b) providing a line image scanner optically disposed near the center of curvature of the curved display screen; and,
   (c) projecting the modulated light beam toward the line image scanner to form a line image on the curved display screen and scanning the modulated light beam to form a two-dimensional image on the curved display screen.

64. A method for providing an image on a curved display screen according to claim 63 wherein the laser illumination beam is directed toward the linear spatial light modulator at a vertically oblique angle.

65. A method for providing an image on a curved display screen according to claim 63 wherein the laser illumination beam is directed toward the linear spatial light modulator at a compound oblique angle.

66. A method for providing an image on a curved display screen according to claim 63 wherein the step of projecting the modulated light beam toward the line image scanner comprises the step of directing the modulated light beam toward a galvanometer mirror.

67. A method for providing an image on a curved display screen according to claim 63 wherein the step of projecting the modulated light beam toward the line image scanner comprises the step of directing the modulated light beam toward a rotating polygon.

68. A method for providing an image on a curved display screen according to claim 63 wherein the step of projecting the modulated light beam toward the line image scanner comprises the step of directing the modulated light beam toward a rotating bigon.

69. A method for providing an image on a curved display screen according to claim 63 wherein the step of directing the laser illumination beam to the linear spatial light modulator comprises the step of directing the laser illumination beam to an array of GEMS elements.

70. A method for providing an image on a curved display screen according to claim 63 wherein the step of directing the laser illumination beam to the linear spatial light modulator comprises the step of directing the laser illumination beam to a GLV device.

71. A method for providing an image on a curved display screen according to claim 63 wherein the step of generating a modulated light beam comprises the step of blocking at least one diffracted order of light modulated at the spatial light modulator.

72. A method for providing an image on a curved display screen according to claim 71 wherein the step of blocking the at least one diffracted order of light modulated at the spatial light modulator comprises the step of blocking a zeroeth order light.

73. A method for providing an image on a curved display screen according to claim 63 wherein the line image scanner is a rotating scanner.

74. A method for providing an image on a curved display screen according to claim 63 wherein the line image scanner is a reciprocating scanner.

75. A method for providing an image on a curved display screen according to claim 63 wherein the step of providing a line image scanner optically disposed near the center of curvature of the curved display comprises the step of providing a line image scanner optically disposed within about 30% of the radius from the center of curvature to the curved display screen.

76. A method for providing an image on a curved display screen comprising:
 (a) generating a modulated line object by modulating a laser illumination beam, the modulated line object is off-axis from a projection lens;
 (b) imaging the modulated line object through the projection lens toward a line image scanner, wherein the line image scanner is optically disposed near the center of curvature of the curved display screen.

77. A method for providing an image on a curved display screen according to claim 76 wherein the line image scanner is off-axis from the projection lens.

78. A method for providing an image on a curved display according to claim 76 wherein the step of modulating a laser illumination beam comprises the step of modulating an array of GEMS elements.

79. A method for providing an image on a curved display screen according to claim 76 wherein the step of modulating a laser illumination beam comprises the step of modulating a GLV device.

80. A method for providing an image on a curved display screen according to claim 76 wherein the step of modulating a laser illumination beam comprises the step of modulating a micromirror linear array.

81. A method for providing an image on a curved display screen according to claim 76 wherein the step of imaging the modulated line object comprises the step of blocking at least one diffracted order of light from the laser illumination beam.

82. A method for providing an image on a curved display screen according to claim 76 wherein the step of modulating a laser illumination beam comprises the step of modulating a vertically oblique laser illumination beam.

83. A method for providing an image on a curved display screen according to claim 76 wherein the step of modulating a laser illumination beam comprises the step of modulating a compound oblique laser illumination beam.

84. A method for providing an image on a curved display screen according to claim 76 wherein the line image scanner is a rotating scanner.

85. A method for providing an image on a curved display screen according to claim 76 wherein the line image scanner is a reciprocating scanner.

86. A method for providing an image on a curved display screen according to claim 76 wherein the line image scanner is optically disposed within about 30% of the radius from the center of curvature to the curved display surface.

87. A method for displaying a two-dimensional image on a display screen comprising:
 (a) providing an illumination beam at a compound oblique angle to a linear spatial light modulator for modulating the illumination beam to form a modulated light beam;
 (b) projecting the modulated light beam toward a line image scanner for forming a line image on the display screen and scanning the modulated light beam to form the two-dimensional image on the display screen.

88. A method for displaying a two-dimensional image on a display screen comprising:
 (a) providing an illumination beam at a vertical oblique angle to a linear spatial light modulator for modulating the illumination beam to form a modulated light beam;
 (b) projecting the modulated light beam toward a line image scanner for forming a line image on the display surface and scanning the modulated light beam to form the two-dimensional image on the display screen.

* * * * *